United States Patent [19]

Jakobs et al.

[11] Patent Number: 5,892,509

[45] Date of Patent: Apr. 6, 1999

[54] IMAGE PROCESSING APPARATUS HAVING COMMON AND PERSONAL MEMORY AND CAPABLE OF VIEWING AND EDITING AN IMAGE COMMONLY WITH A REMOTE IMAGE PROCESSING APPARATUS OVER A NETWORK

[75] Inventors: Thomas Jakobs, Chicago; Wayne D. Jung, Skokie; Richard A. Karlin; Leonard Reiffel, both of Chicago; Raphael K. Tam, Glenview; Timothy T. Tutt, Skokie; Michael F. Dunk, DesPlaines, all of Ill.

[73] Assignee: L G Semicon Co., Ltd., Cheongju, Rep. of Korea

[21] Appl. No.: 222,155

[22] Filed: Apr. 4, 1994

Related U.S. Application Data

[63] Continuation of Ser. No. 751,605, Aug. 21, 1991, Pat. No. 5,300,943, which is a continuation of Ser. No. 395,160, Jun. 17, 1989, abandoned, which is a continuation of Ser. No. 914,924, Oct. 3, 1986, abandoned.

[51] Int. Cl.$^6$ .............................. G06F 13/00; G09G 5/00
[52] U.S. Cl. ............................. 345/331; 345/1; 345/173
[58] Field of Search .................................. 345/1–3, 173, 345/10, 179, 175, 168, 112, 160, 329–332, 507, 512; 395/153, 121, 421.06, 200.01, 250, 300, 311, 200.39, 857; 348/15, 96; 364/189

[56] References Cited

U.S. PATENT DOCUMENTS

| | | | |
|---|---|---|---|
| 3,670,322 | 6/1972 | Mallebrein | 345/175 |
| 3,944,997 | 3/1976 | Swallow | 395/121 |
| 4,001,807 | 1/1977 | Dallimonti | 345/1 |
| 4,017,848 | 4/1977 | Tannas, Jr. | 345/173 |
| 4,222,076 | 9/1980 | Knowlton | 364/300 |
| 4,301,449 | 11/1981 | Fitzgerald | 345/173 |

(List continued on next page.)

FOREIGN PATENT DOCUMENTS

| | | | |
|---|---|---|---|
| 0114253 | 8/1984 | European Pat. Off. | 345/10 |
| 183288 | 6/1986 | European Pat. Off. | |
| 2847135 | 5/1980 | Germany. | |
| 582043 | 6/1956 | Japan. | |
| 50115120 | 3/1977 | Japan | 7/12 |

(List continued on next page.)

OTHER PUBLICATIONS

"Xerox's Star", The Seybold Report, vol. 10, No. 16, Apr. 27, 1981. ISSN 0364–5517.

Journal "bit", Feb. 1983 Issue. Published by Kyouritsu Shuppan, pp. 4–13.

Journal "Information Processing", vol. 24, No. 2 (1984), pp. 132–155.

Journal "bit", Jul. 1983 Issue, published by Kyouritsu Shuppan, pp. 3–21.

*Primary Examiner*—Jeffery Brier
*Assistant Examiner*—Paul A. Bell
*Attorney, Agent, or Firm*—Loudermilk & Associates

[57] ABSTRACT

An image processing apparatus coupling at least two image processing systems connected to a network. The network couples image information to each system, and each system displays at least one image. Each system includes a communication unit and a control unit. The communication unit couples information to and receives information from the network. The control unit includes a central processing unit (CPU) and a partitioned memory space, including, both common and personal memory. The personal memory of each system contains one or more personal images that can be viewed only by the respective system, wherein each system is controlled to access only its respective personal memory. Under control of the CPUs in the respective systems, a common image is coupled to each system over the network and commonly displayed on each system. While the common image is commonly displayed on each system, it is edited by the first image processing system.

79 Claims, 5 Drawing Sheets

U.S. PATENT DOCUMENTS

| | | | |
|---|---|---|---|
| 4,310,839 | 1/1982 | Schwerdt | 345/173 |
| 4,366,506 | 12/1982 | Ejiri et al. | 358/260 |
| 4,379,950 | 4/1983 | Ahmed | 395/153 |
| 4,381,552 | 4/1983 | Nocilini et al. | 364/707 |
| 4,386,232 | 5/1983 | Slater | 345/173 |
| 4,396,977 | 8/1983 | Slater et al. | 345/173 |
| 4,413,314 | 11/1983 | Slater et al. | 345/173 |
| 4,414,580 | 11/1983 | Johnsen et al. | 358/260 |
| 4,414,621 | 11/1983 | Bown et al. | 395/153 |
| 4,430,526 | 2/1984 | Brown et al. | 345/179 |
| 4,441,001 | 4/1984 | Miyano et al. | 345/168 |
| 4,451,895 | 5/1984 | Sliwkowski | 345/173 |
| 4,484,262 | 11/1984 | Sullivan et al. | 395/421.06 |
| 4,484,270 | 11/1984 | Quernemoen et al. | 395/857 |
| 4,513,390 | 4/1985 | Walter et al. | 348/96 |
| 4,521,870 | 6/1985 | Babbel et al. | 345/173 |
| 4,531,184 | 7/1985 | Wigan et al. | 345/330 |
| 4,577,187 | 3/1986 | Barr et al. | 345/112 |
| 4,601,003 | 7/1986 | Yoneyama et al. | 345/1 |
| 4,695,966 | 9/1987 | Takauva et al. | 345/1 |
| 4,698,753 | 10/1987 | Hubbins et al. | 365/200.39 |
| 4,704,697 | 11/1987 | Kiremidjian et al. | 345/2 |
| 4,706,067 | 11/1987 | Hauck | 345/160 |
| 4,710,868 | 12/1987 | Cocke et al. | 395/311 |
| 4,710,917 | 12/1987 | Tompkins et al. | 348/15 |
| 4,712,191 | 12/1987 | Penna | 345/173 |
| 4,716,542 | 12/1987 | Pultz et al. | 345/173 |
| 4,720,849 | 1/1988 | Tayama | 345/1 |
| 4,731,750 | 3/1988 | Hoflich | 395/200.01 |
| 4,811,284 | 3/1989 | Adler et al. | 395/250 |
| 4,827,410 | 5/1989 | Corren | 345/173 |
| 4,870,704 | 9/1989 | Matelan et al. | 395/300 |
| 4,884,068 | 11/1989 | Matheny et al. | 345/1 |
| 4,891,633 | 1/1990 | Imazeki et al. | 345/2 |
| 5,300,943 | 4/1994 | Jakobs et al. | 345/1 |

FOREIGN PATENT DOCUMENTS

| | | | |
|---|---|---|---|
| 53-144225 | 12/1978 | Japan . | |
| 58-125134 | 7/1983 | Japan . | |
| 58-129536 | 8/1983 | Japan . | |
| 58-144287 | 8/1983 | Japan . | 11/6 |
| 59-43434 | 3/1984 | Japan . | |
| 59-45575 | 3/1984 | Japan . | |
| 59-148928 | 8/1984 | Japan . | |
| 59-170980 | 9/1984 | Japan . | 11/6 |
| 59-195734 | 11/1984 | Japan . | |
| 60-14373 | 1/1985 | Japan . | |
| 60-48535 | 3/1985 | Japan . | 11/6 |
| 61-79360 | 4/1986 | Japan . | |
| 61-80455 | 4/1986 | Japan . | |
| 61-84371 | 4/1986 | Japan . | 3/37 |

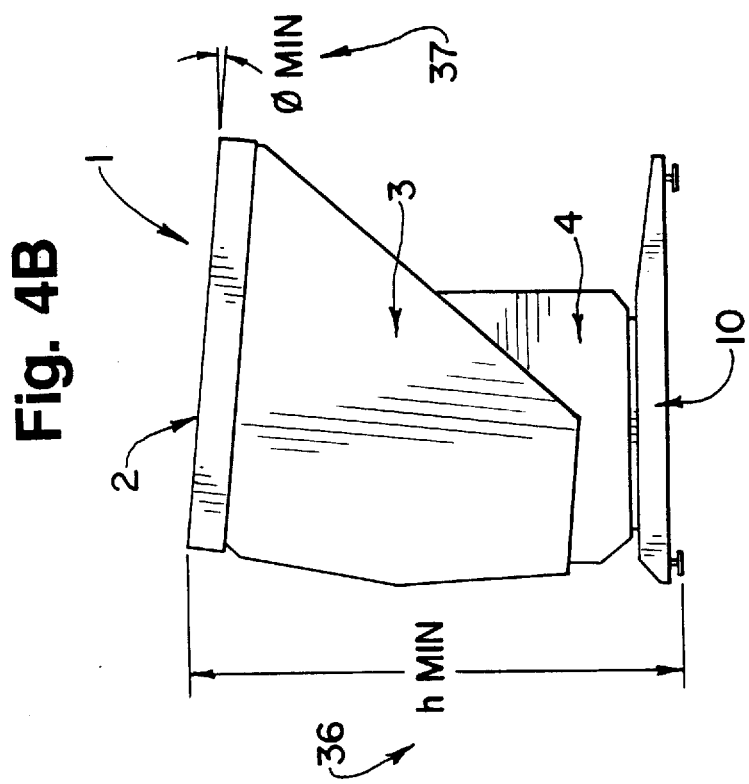
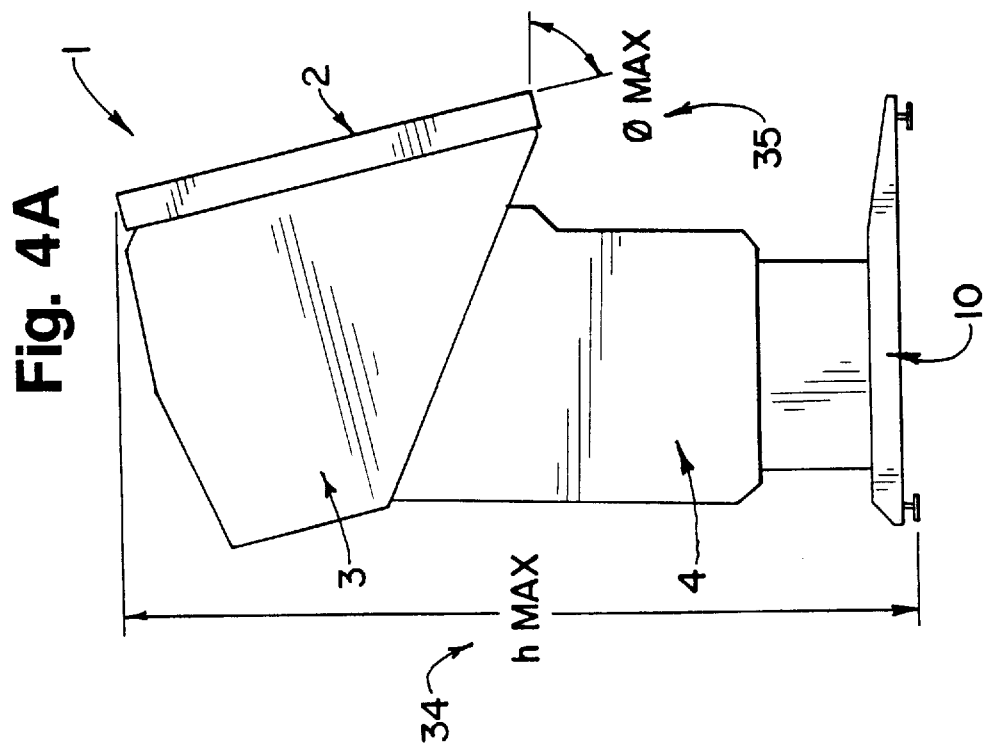

IMAGE PROCESSING APPARATUS HAVING COMMON AND PERSONAL MEMORY AND CAPABLE OF VIEWING AND EDITING AN IMAGE COMMONLY WITH A REMOTE IMAGE PROCESSING APPARATUS OVER A NETWORK

This is a continuation of application Ser. No. 07/751,605 filed Aug. 21, 1991, now U.S. Pat. No. 5,300,943, which is a continuation of application Ser. No. 07/395,160 filed Jun. 17, 1989, now abandoned, which is a continuation of application Ser. No. 06/914,924, Oct. 3, 1986, now abandoned.

BACKGROUND OF THE INVENTION

1. Field of the Invention

The present invention relates to an electronic image processing workstation, and more particularly to a workstation comprising functionally integrated multiple displays that are clustered under a single transparent energized conductive surface, which operates as an input device and a functionally integrated communication link. Each display is optimized for a particular function. The present invention maximizes the ability of the user to create, capture, manipulate, annotate, reproduce, file, transmit and otherwise communicate electronic images.

2. Description of the Prior Art

Since the development of the personal computer, computers are now used in virtually every business. As use of computers increased, systems were developed primarily to meet the specific needs of particular business sectors. For example, it is common to find, within a single business, computer applications for word processing, computer graphics, computer aided drafting, accounting, marketing data bases, project tracking, computer aided design, and corporate electronic publishing. However, while many of these applications can be accomplished with interchangeable application-specific software packages, they often utilize general purpose workstation hardware that is neither powerful enough nor application specific enough to optimize performance.

Prior art single-display workstations also are limited in their lack of display flexibility. Prior art workstations do not provide for both the document quality of high resolution black and white displays and the descriptiveness of multi-color graphics. Frequently in presenting information, the need arises to display color graphics that relate to displayed text. General purpose workstations are incapable of providing both displays on the same system.

Another limitation of prior art workstations is that they often utilize screen-displayed menu-driven software. Though screen-menu systems make operating systems easier to use, they have several characteristics that limit their performance, particularly in single display workstations where menu and work must share a single device. Screen-menu systems decrease the speed of the system due to the time required to regenerate or reprint the screen each time the menu is called or released. Further, whether keyboard or mouse controlled, menu systems require repetitious manual movements to reach the desired menu level. Moreover, in screen-menu systems, the menu is not visible to the user prior to its being called. Since the menu is hidden from the user, there is no constant visual reminder of the potential functions offered by the system.

Prior art workstations also fail to address the need for systems integration. Systems integration is necessary to provide users with a system that is both flexible in its applications, yet easy for the operator to learn and use. Of the current workstations, few offer highly efficient integration of system functions. Current workstations generally fall in one of two categories: (1) systems that are highly flexible and accommodate a variety of applications but are complex and require extensive training to use; or (2) systems that are easy to use but are rigidly designed for specific applications. Prior art workstations do not provide highly flexible systems wherein the complexity of the system is transparent to the user.

Prior art workstations also lack an integrated real-time full-duplex communication capability. Without this capability they cannot allow dispersed users to edit a single document as a simultaneous group activity. Without systems integration, workstations also are unable to integrate voice communications into the workstation. While working at a workstation, it is often necessary to discuss the activity in which the user is engaged. However, for the voice portion of the communication, the user must use standard telephone communications, which causes many inconveniences and delays. If a hand-held telephone is used, activity at the workstation is impaired due to stopping of activity while the user speaks, using one hand to hold the telephone, or inconveniently cradling the telephone between the ear and shoulder. If a speaker-phone is used, and workstation information is being transmitted via modem, the two types of information are usually not synchronized. The lack of integration of voice and data communications capability in workstations prohibits the transmission of synchronized data and communications between workstations.

Prior art workstations also are limited in their ability to display and manipulate true graphic images. Current workstation displays are designed for ASCII-code character display. These ASCII-code based displays place characters at fixed character row and column positions and cannot arbitrarily rotate and translate characters and cannot mix these characters freely with graphics. Thus, in electronic publishing, for example, these prior art displays cannot accommodate and display kerning, ligature, and runaround type setting, to name just a few specialized type sets.

Another limitation of prior art work stations is restricted size of their field of view. The field of view of most workstation displays is limited to 23 rows for ASCII-code based systems. Since a standard hardcopy page is commonly 66 lines of text in length, the restricted field of view complicates the composition and modification of a standard page of text. Display of only 23 lines of text also increases the time and effort spent in moving from page to page within a document, as numerous keystrokes are required to view the entire document.

Inherent in current workstations is the inability to modify displayed images by allowing the user to interact directly with the displayed image. Instead, users are required to use a mouse, lightpen, or digitizing tablet. However, these input devices require the user to split his attention between the display and the input device. The user must watch a display located in one place, while manually controlling an input device located elsewhere.

Yet another limitation of current workstations is their inability to overlay and/or combine images, graphics and text. Overlaying is extremely useful in describing or modifying a displayed drawing. For one example, overlaying can be used to compare two images. For another example, when discussing a hardcopy drawing, it is often useful to graphically embellish the presentation with a colored ink pen. Without the ability to do overlays and combinations, the usefulness and power of current workstations is greatly limited in such applications.

Finally, prior art workstations generally require extensive preparation prior to presentation of material and do not readily accommodate modifications. For example, during a presentation, a need often arises for graphical annotation of the subject material. With current workstations, the modification is completed only after considerable effort in resetting parameters and re-positioning graphics characters. Since most of the current workstations do not allow for quick real-time annotation, any required annotation usually cannot be completed during the presentation period.

Prior art workstations also offer only a limited range of adjustment of display positions. Some offer upright displays that are difficult on which to write. Others offer flat displays that inhibit group viewing. Still others have limited freedom of height adjustment making them difficult to adapt to persons of differing sizes. The lack of height adjustment inhibits use of the workstation for both sitting and standing operation. As a further example of the ergonomic restrictiveness of prior art workstations, a typical configuration that is suitable for word processing often is not suitable for computer aided drafting, while a typical configuration that is suitable for computer aided drafting often is not suitable for word processing. Moreover, neither of these configurations functions effectively as a lectern apparatus for addressing an audience.

Accordingly, it is an objective of the present invention to overcome the limitations of the prior art by providing an improved system with multiple displays that maximizes the ability of the user easily to capture, create, manipulate, annotate, reproduce, file, transmit, and otherwise communicate electronic images.

Another objective of the present invention is to provide an overlay mode that enables overlays of any combination of images, graphics, or text.

Still another objective of the present invention is to provide a flexible image display workstation that integrates voice and data communications with advanced image processing capability.

Another objective of the present invention is a workstation which performs image editing functions including rotation, scaling up or down in size in either or both directions, cutting, pasting annotation, "white-out", "restoration" (to previous state), and other editing functions.

Yet another objective of the present invention is a workstation which performs hierarchical filing, such as file drawers containing files which contain documents which comprises pages, including filing functions such as copy, move, delete, and reorganize.

Still another objective of the present invention is a workstation which compartments image memory, either literally or virtually (by means of software) into common visual space (seen by all communication linked stations—all "conferees") and personal visual space (seen only by the individual workstation).

One more objective of the present invention is a workstation which can be controlled from beginning to end of the work session with a stylus which can serve as: a function selector, a pen, an eraser, a pointer, a mouse, and/or a keyboard.

Yet one more objective of the present invention is a workstation which provides a paperless editing facility and a paperless facsimile machine.

Finally, it is an objective of the present invention to provide a flexible image display workstation that is suitable for mounting in a mechanical structure that can be manipulated as to orientation and height to allow optimization as to user physical attributes and user intended activity.

SUMMARY OF THE INVENTION

The present invention is an electronic image processing workstation, with functionally integrated, multiple displays clustered under a single transparent energized conductive surface that operates as an input device further integrated with a real time full-duplex communications capability. Each display is optimized for a particular function. Also located on the energized conductive surface are a number of permanent function symbols. The functions associated with the symbols are initiated via a stylus associated with the conductive surface. As more fully described below, the optimized displays and the function symbols operate in response to the stylus and the conductive surface and provide a powerful yet flexible workstation with significant advantages over prior art workstations.

The present invention achieves the above objectives by clustering two or more functionally integrated displays under a single transparent energized conductive surface that operates as an input device. Such a conductive surface system is disclosed in U.S. Pat. No. 4,603,231 issued Jul. 29, 1986 to L. Reiffel et al., for the "System for Sensing Spatial Coordinates, the disclosure of which is hereby incorporated by reference. This system utilizes an energized conductive surface to sense spatial coordinates of a stylus with respect to the conductive surface. With the conductive surface comprised of a transparent material, it can be used as an overlay for devices such as video displays. With such an arrangement and proper electronic control, the stylus can be utilized to interact with the image on the video display.

In the present invention, this conductive surface acts as the input control device for the cluster of displays and for the permanent function symbols. In prior art applications, the conductive surface controlled only one display. However, with the novel arrangement of the present invention, multiple displays and function symbols are controlled by the stylus and conductive surface. The present invention provides the user with the unique ability to write, with the same familiarity and ease as using a pen, directly on any of a number of displayed images, as well as access various system functions by directing the stylus to the fixed function symbols, and further to control the editing of these images with the same stylus.

The present invention utilizes this energized conductive surface, together with accompanying stylus and electronics, to significantly improve the speed, accuracy, and ease of use of the displays of the present invention. The conductive surface extends over and (optionally) past the surfaces of a cluster of functionally integrated displays. The operator can make menu selections from the various displays using the stylus of the present invention, or the operator can write on and/or edit any of the display images. This includes cutting and pasting of documents and images; pointing to or erasing particular portions of a document or image; rotation of images; scaling of images; and restoring to a previous state the modified document or image. In addition, using the stylus of the present invention, actual user handwriting can be displayed, stored and retrieved, either alone or in association with displayed documents or images. Thus, the present invention can be used as an electronic chalkboard that is simultaneously viewable at the various workstation locations.

The efficiency of the present invention is increased by permanently providing frequently used menu and system control functions on the work surface. These functions are permanently silkscreened on the conductive surface covering the work surface. Using coordinate comparison, the control system of the conductive surface of the present invention uses the stylus and conductive surface to sense when the stylus is directed towards a particular symbol. When the control system senses that the stylus is near a particular symbol, it initiates the function associated with that symbol. These permanent functions and controls provide a number of benefits. They eliminate the need to search various menu levels for the appropriate menu function. This facilitates the editing of documents or images as well as the editing and manipulation of directories, files and other high level data constructs. Moreover, they have no screen regeneration time delay associated with their access. Finally, these menu functions serve as a permanent visual reminder of the system capabilities. The permanent functions are identified by an easy to recognize symbol, which are easier to recognize and remember than cryptic menu keywords. Users with little or no training are able to initiate the desired functions by directing the stylus to the appropriate symbols.

The present invention can also simultaneously display directory listings (on the menu display) and work images (on the other displays) eliminating the need for windowing and for printed directory listings.

Also with the present invention, the displays clustered under the conductive surface can be optimized for specific purposes. For example, one display can be dedicated for menu display. This allows permanent display of at least one menu level, which can include document directories, for easy reading of the menu typography and icons and available documents. This display can be black-and-white, (two-tone) non-interlaced, and have high-resolution. Another display can be utilized primarily for document display. This display is chosen to allow permanent display of the subject document in a very high resolution black-and-white (two-tone) mode. Still another display can be a dedicated color display. This allows the display of graphic material with color and/or grey-scale (multiple) (multiple tone is the digital equivalent of continuous tone).

In the preferred embodiment, each of the displays clustered under the conductive surface performs a specific function within the system, either alone or in combination with other displays. For example, one display is designed for high resolution black and white capabilities. This display is particularly suitable as a display for documents, other forms of text and other images that require a high degree of legibility but do not require multiple-tone or color. Display size is such as to provide display of a full sized standard page of text. The page of text in the present invention is the complete hardcopy page, reproduced without scaling, and is not restricted to 23 rows as are the ASCII-code based systems known in the prior art.

Another display in the preferred embodiment is used exclusively for screen display menu commands and for the image directory listings. This separate menu display allows for retention of the advantages of menu driven systems, while avoiding work display-menu display conflicts and work display-directory display conflicts. With this separate menu display, the number of regenerations of menus and work images is significantly reduced compared to number of regenerations for standard menu systems. Also, since the menu display has less total bits than the very high resolution display, those regenerations which are required will be much faster.

A third display is provided for the display of high resolution color graphics and captured images. The user can control this display via the conductive surface to annotate a displayed captive image. Color and grey level graphics annotation are available with this display. The combination of the three displays gives the user a combination of display functions and resolution levels to meet the requirements of most applications. For example, the viewer can simultaneously review text and a related picture, much like viewing the text and pictures in a magazine article. As another example, the color display can be used to display the portrait of the individual presenting the document or verbal communication, thereby displaying the author/speaker at the various locations in teleconferencing applications. Such flexibility is not found in prior art workstations.

The present invention provides a highly integrated system that provides the user with a system that is powerful and flexible, yet is easy to learn and use. An example of this integration can be seen in the integrated use of the energized conductive surface as an input device for both the cluster of displays and the permanent function symbols. Selected displays within the cluster of displays have also been integrated. For example, the menu display and the high resolution display are integrated to provide the advantages of a high resolution display and a system menu display without the time delay that would result if both of these functions were present on a single display.

An analog and digital full-duplex communication subsystem further integrates with displays and control surfaces., As a further example of the flexibility of the present invention, a document directory can be displayed on the menu display, while documents are displayed on the document display. Using the stylus as a pointer, the user can point to a document listed in the directory, while simultaneously viewing that document on the document display.

The present invention provides integration capabilities that allow the user to utilize the system in a wide range of applications. Functions such as facsimile transmission capability, the capability to use multiple storage media, the ability to use a variety of communications channels, and real-time voice, data, and video communications allow the user extensive system flexibility. Two or more systems can link to allow fully-interactive real time distributed conferencing and editing wherein dispersed users can work cooperatively on images viewed by all of them. For example, users at various locations can interact with and simultaneously view the same image, while cooperatively manipulating the image, with changes to the image made at one workstation instantaneously viewed by the users at all workstations. The present invention thus provides a highly flexible integrated system whose complexity is transparent to the user.

In addition to integrating voice communications, the present invention uses a hands-free voice subsystem. The hands-free voice subsystem gives the user the freedom to continue non-interrupted work on the work surface while continuing to talk. The hands-free voice subsystem is fully synchronized with the other portions of the transmission. The synchronized and integrated voice subsystem permits real-time synchronized workstation communications activities.

The present invention also allows for the display of real images. Image input information is received from an electronic image pickup device. The present invention captures the image and is capable of filing the image in an electronic image memory system.

These images can include portraits and these portraits can be selectively displayed according to the person who is speaking and/or writing.

The present invention also is capable of free floating character positions and can arbitrarily mix characters freely with graphics suiting it to graphics art creation and to electronic publishing. This workstation is capable of accommodating many complex styles of typesetting such as kerning, ligature, and runaround, thus suiting it well to electronic publishing uses.

Moreover, an image filed in the system can be quickly overlayed on top of other images filed in the system. Graphics also can be quickly overlayed on top of a displayed image by drawing on the screen on which the image is displayed. The overlay can then be stored or permanently copied onto the original. This technique also can be utilized for multiple images.

The packaging of the present invention allows quick and easy adjustments that custom fit the system to the physical attributes of the user and the specific configuration requirements for the particular application. Adjustments can be made to the angle and the vertical height of the work surface. A wide range of angular adjustments allows one to choose the most comfortable and efficient work surface angle. Vertical adjustments are provided, ranging from seated-use desk height, to standing-use lectern height, to accommodate most users and most applications.

BRIEF DESCRIPTION OF THE DRAWINGS

A better understanding of this invention may be gained from a consideration of the following description, presented by way of example, with reference to the accompanying drawings in which;

FIG. 4(a) and FIG. 4(b) are right side views of the minimum/maximum adjustments of the workstation.

DETAILED DESCRIPTION OF THE PREFERRED EMBODIMENT

Figure 1:
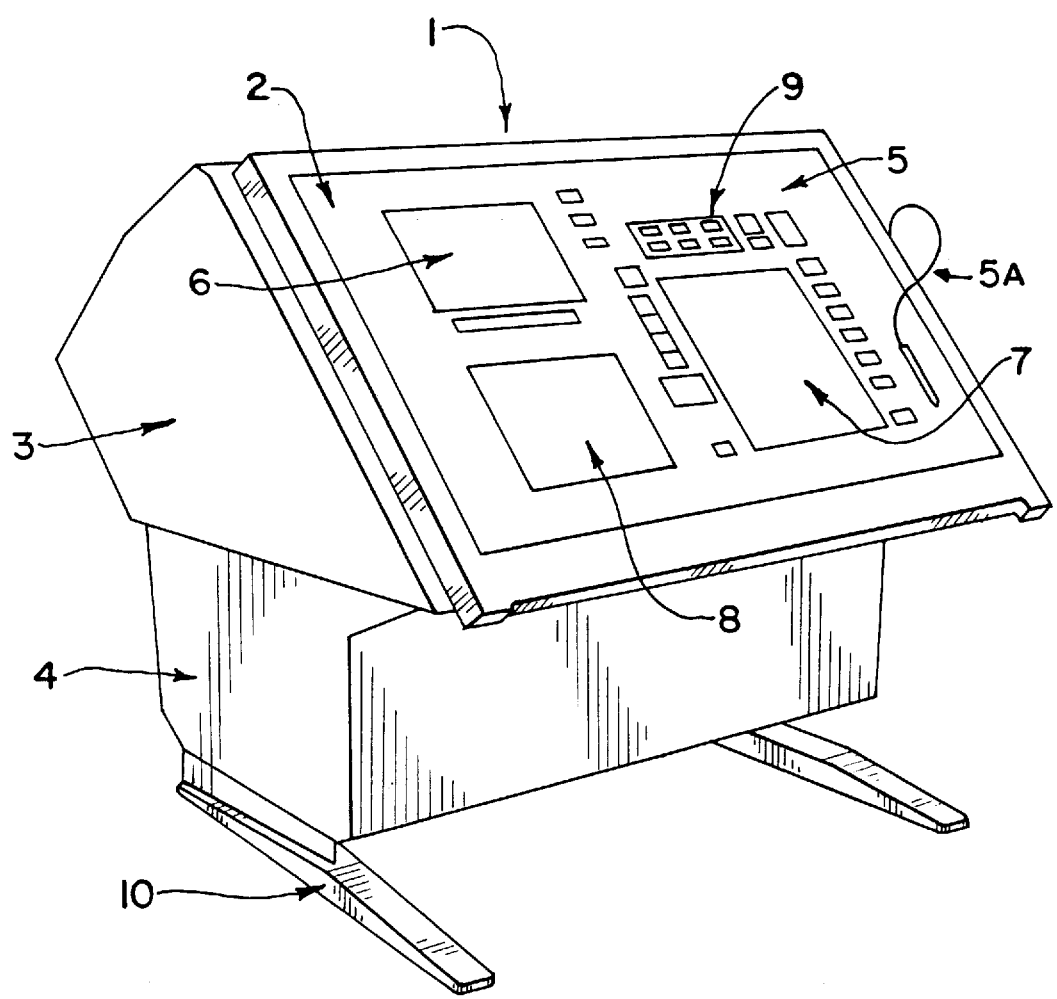
FIG. 1 is an illustration of the workstation.

In describing the preferred embodiment of the invention illustrated in the drawings, specific terminology will be resorted to for the purpose of clarity. However, it is not intended to be limited to the specific terms as selected and it is to be under stood that each specific term is inclusive of technical equivalents that operate in a similar manner to accomplish a similar purpose.

FIG. 1 illustrates an overview of the preferred embodiment of the present invention. In the preferred embodiment, electronic image processing workstation 1 comprises a worksurface 2, an upper console housing 3, a lower console housing 4, a supporting base 10, an energized conductive surface 5 that extends under work surface 2, a still picture display 6, a high resolution display 7, a menu display 8, and general groupings of permanent function symbols generally denoted by 9.

Conductive surface 5, located below work surface 2, functions as a user interface to workstation 1. Mounted within upper console housing 3 and beneath the surface of conductive surface 5 are workstation displays 6, 7 and 8, which, in the preferred embodiment, are commercially available video display monitors. The functions associated with permanent function symbols 9 are initiated by directing stylus 5a towards conductive surface 5 at the respective location of the particular function symbol. Thus, stylus 5a and conductive surface 5 are the controlling input devices for function symbols 9. Function symbols 9 are permanently affixed to conductive surface 5, such as by a silk screen process. Other methods of permanently marking function symbols 9, such as adhesive labels and etching could, be used in other embodiments. The chosen silk screen method provides for placing function symbols 9 in a convenient, permanent and repeatable position on conductive surface 5.

The supporting frames (not explicitly shown) for console housing 3, lower console housing 4 and work surface 2 are fabricated from a rigid material such as plastic or sheet metal, which is formed and mounted to a structural frame (not explicitly shown) of conventional design. Upper console 3 is angularly adjustable relative to lower console 4. Lower console 4 is linearly adjustable in the vertical direction. In the preferred embodiment, these adjustments are executed with the assistance of built-in electric motors (not explicitly shown) and actuators (not explicitly shown) of conventional design. In other embodiments, these adjustments are executed by using other well-known forms of mechanical, hydraulic, or vacuum systems.

Figure 2:
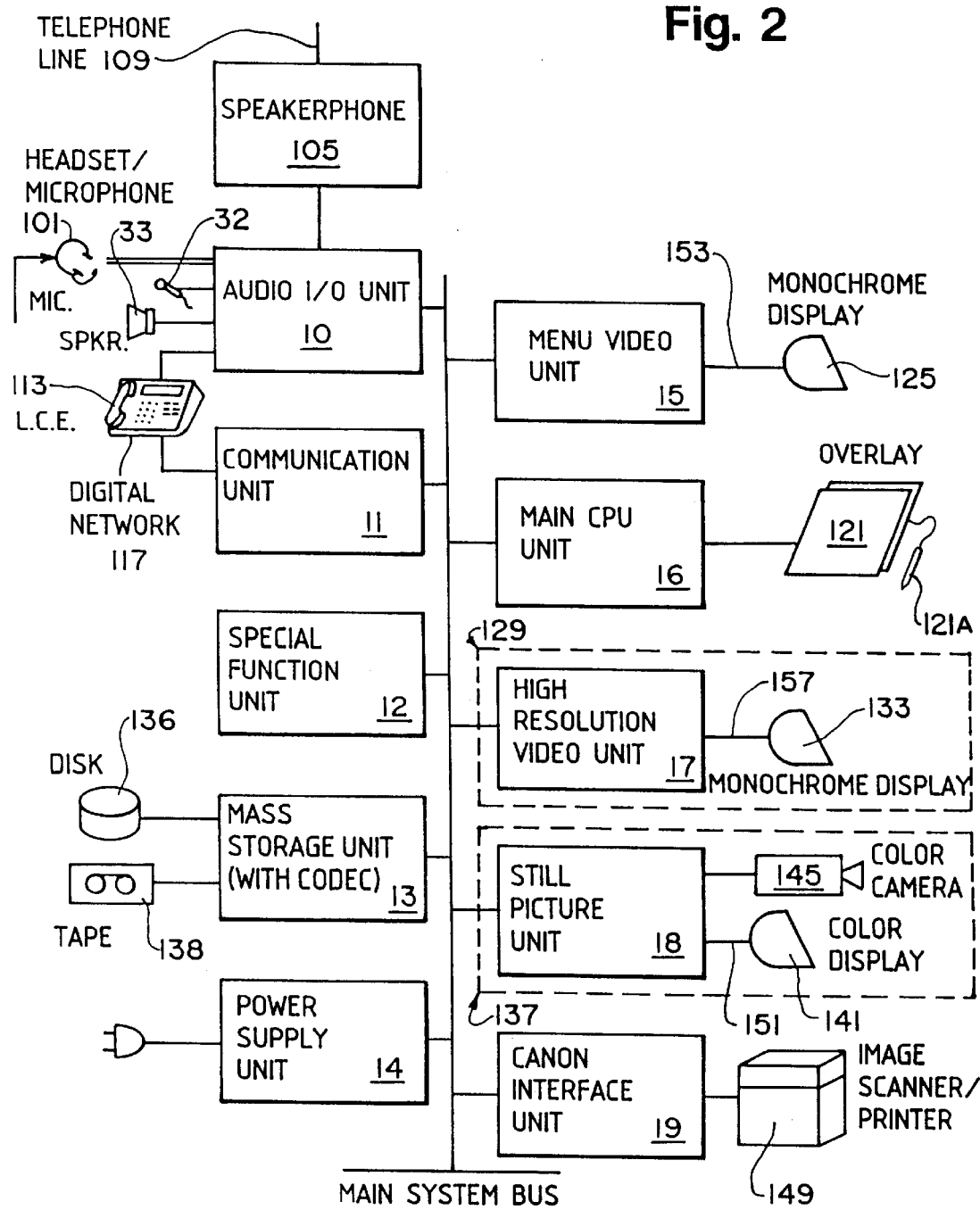
FIG. 2 is a block diagram of the workstation system.

FIG. 2 is a block diagram of the electronic system of workstation 1. An audio I/O unit 10 communicates with the main system bus 20, receives signals from microphone 32, and drives speaker(s) 33. In the preferred embodiment, microphone 32 is Model No. BT1759 manufactured by Knowles Co., the reference and operating manuals for which are hereby incorporated by reference. Also in the preferred embodiment, speaker(s) 33 is (are) Model No. 84BP01 manufactured by Mura, the reference and operating manuals for which are hereby incorporated by reference. Audio I/O unit 10 also receives audio (voice) signals from external (plug-in) microphone 32 and plug-in headset 101 and drives external earphones 101 and speakers 33. In the preferred embodiment, headset and earphones 101 are Star-Mate Model E, manufactured by Plantionics, the reference and operating manuals for which are hereby incorporated by reference.

Audio I/O unit 10 supports hands-free voice communication over the general switched telephone network (also referred to as the dial network) by interfacing with speakerphone 105. Speakerphone 105 is of conventional design, and connects to telephone line 109 in a conventional manner In the preferred embodiment, speakerphone 105 is a Model 800SP manufactured by NTT, the reference and operating manuals for which are hereby incorporated by reference.

Audio I/O unit 10 also supports hands-free voice communication over digital network 117 by interfacing with digital communication unit 113. Digital communication unit 113 known in the art, and, in the preferred embodiment, is manufactured by N.T.T. Corporation, the reference and operating manuals for which are hereby incorporated by reference. Communication unit 113 provides the necessary coding/decoding function and signal protocol conversion that enables audio I/O unit 10 to interface digital network 117. Digital Network 117 can be, for example, the Japanese ISN Network, or any CCITT ISDN.

Under control of the main CPU unit 16, which receives user commands from conductive surface 121 (the stylus and spatial coordinate sensing system, such as described in U.S. Pat. No. 4,603,231 issued Jul. 29, 1986 to L. Reiffel at al., for "System for Sensing Spatial Coordinates," the disclosure of which is hereby incorporated by reference), audio I/O unit 10 controls muting, microphone and speaker selection, and similar audio functions for headset 101, microphone 32 and speaker 33, for example.

Communication unit 11 interfaces the main system bus 20 to digital communication unit 113. Digital communication unit 113 establishes connection with digital network 117, thereby enabling digital communications between main system bus 20 and digital network 117 through communication unit 11.

Special function unit 12 performs hardware-assisted data manipulations that allow the system, under control of main CPU unit 16, in turn controlled by the user through conductive surface 121, to perform transformations on or between any of the three display images: menu, high resolution, and still picture by causing data to flow from the respective display memory (not explicitly shown) through special function unit 12. Special function unit 12 manipulates the image data and returns it in altered form to the same or a different location in either the same or a different display memory.

Mass storage unit 13 provides secondary digital memory in the form of hard disc (e.g.—Winchester), magnetic diskette, and magnetic tape or other conventional digital storage technologies. In the preferred embodiment, main storage unit 13 interfaces disk drive 136 and tape unit 138 to main system bus 20. Also in the preferred embodiment, disk drive 136 is Model D5146 manufactured by NEC, and tape unit 138 is Floppy Tape ID1020 manufactured by Interdyne, the reference and operating manuals for which are hereby incorporated by reference. Main storage unit 13 interfaces memory units 136 and 138 in a conventional manner to main system bus 20.

Power supply 14 is of conventional design and receives a.c. power from the main power source and transforms it to rectified and filtered d.c. voltages that are suitable for the circuits of workstation 1. In the preferred embodiment, power supply 14 is Model No. HS300-01 manufactured by Koby Electronics, the reference and operating manuals for which are hereby incorporated by reference. Power supply 14 has a standby (or sleep mode) low power mode that allows workstation 1 to monitor the communication lines, such as telephone line 109 and digital network 117, and respond to remote requests but to consume lower amounts of power than when in the normal "on" state, with all components active.

Menu video unit 15 comprises the display electronics for display 125, which, in the preferred embodiment, is a 13-inch (diagonal) monochrome display. In the preferred embodiment, display 125 is a 13 inch 15V4972-OOM Monitor manufactured by Wells Gardener, the reference and operating manuals for which are hereby incorporated by reference. In the preferred embodiment, display 125 primarily is used to display screen menus and directory listings. The combination of menu video unit 15 and display 125 constitute a full display system. Menu video unit 15 comprises conventional video control electronics memory for the video display. Display 125 converts the electronic signals from menu video unit 15 to a visual display by scanning an electron beam across a phosphor screen in a conventional manner. The menu display is 1024 pels across by 393 pels vertical, one-bit per pel, operating non-interlaced.

The menus displayed on the display 125 are visually located under conductive surface 121. Because conductive surface 121 is transparent, the image on display 125 is visible to the user. The user is thus able to make menu selections by directing stylus 121a (see also stylus 5a of FIG. 1) over the appropriate menu legend or icon and touching stylus 121a to conductive surface 121 (the work surface of the workstation). Conductive surface 121, senses the coordinates of stylus 12a, and transmits these coordinates and the information that stylus 121a as touched conductive surface 121 to the main CPU 16. Using a coordinate comparison look-up table technique, main CPU unit 16 interprets the coordinates as a selection of the new command represented by the new legend or icon. The selected command is then executed by main CPU 16. This menu display function is optimized for the display of menus with legends and icons in easy-to-read and attractive form, thereby facilitating user recognition and operation.

As illustrated in FIG. 2, the menu video unit 15 receives data and control signals through the main system bus 20.

In the preferred embodiment, the high resolution video unit subsystem 129, comprises high resolution video unit 17 and display 133. High resolution video unit 17 functions in a manner similar to menu video unit 15. In the preferred embodiment, display 133 is a 17" monochrome display, model VX1500-T17-P164-IE-SPS manufactured by Moniterm, the reference and operating manuals for which are hereby incorporated by reference. Display 133 is vertically oriented (portrait style), as opposed to the horizontally oriented (landscape display 125. High resolution subsystem 129 supports a 1728 pel across by 2368 pel vertical display, consisting of a single bit of memory (on-off; white-black) per pel. This display subsystem is functionally optimized for documents displayed in group 3 and group 4 (CCITT) facsimile formats.

The data for the images to be displayed on display 133 are communicated to the high resolution video subsystem 129 (and high resolution video unit 17) via main system bus 20 in a conventional manner.

High resolution video subsystem 129 primarily is used for the display and manipulation (editing, annotation, etc.) of document images. As with display 125, display 133 lies under conductive surface 121. The user places stylus 121a on conductive surface 121 (workstation surface) at a point over the image to be edited or manipulated. The functions to be performed on the portion of the image are selected by the user through stylus 121a by making selections of the permanent function symbols 9 (of FIG. 1) (as more fully described below) or on menu functions typically displayed on display 125.

Still picture subsystem 137, comprising still picture unit 18, display 141 and color camera 145, is functionally optimized for the display of images that have either or both color or continuous tone (grey scale). In the preferred embodiment, display 141 is a 13-inch (diagonal) color display CRT monitor, model CM4000, manufactured by Motorola, the reference and operating manuals for which are hereby incorporated by reference. Display 141 is horizontally (landscape) oriented. Also in the preferred embodiment, the components of subsystem 137 are functionally optimized for the display of images that have either or both color or continuous tone (grey scale). Still picture unit 18 supports 640 pels across by 480 pels vertically with one byte of data per pel. Camera 145 allows video pictures to be captured by still picture unit 18, which digitizes these pictures and stores them in its video memory (not explicitly shown). In the preferred embodiment, camera 145 is a Model No. DXC-3000 manufactured by Sony Corp., the reference and operating manuals for which are hereby incorporated by reference.

Still picture subsystem 137 communicates with the other components of workstation 1 via main system bus 20 in a conventional manner. Stylus 121a and conductive surface 121 are used to interact with the image on display 141 as with high resolution subsystem 129 and display 133 as described above.

Interface unit 19 is a conventional circuit that interfaces main system bus 20 with image scanner printer 149. In the preferred embodiment, scanner printer 149 is a Model NP9030 manufactured by Canon, the reference and operating manuals for which are hereby incorporated by reference. Scanner printer 149 acts as both an input and an output device for workstation 1. Scanner printer 149 scans paper-based images that are inserted therein and supplies an electronic image data equivalent of the paper image to interface unit 19. Interface unit 19 communicates the image data to main system bus 20 for storage in either the memory of high resolution video unit 17, or alternatively in the memory of main CPU unit 16 or in the secondary memory interfaced via main storage unit 13.

Images from any memory in workstation 1 can be transmitted via main system bus 20 to interface unit 19, and from there to scanner printer 149 for conversion to a hard copy.

Other input devices using conventional formats can be attached via appropriate interface units to the main system bus 20 in a conventional manner. Other output devices also may be attached to workstation 1 by using suitable interface units from either main system bus 20 or the display system video outputs 153, 157 and 161 of display 125, 133 and 141, respectively.

Figure 3:
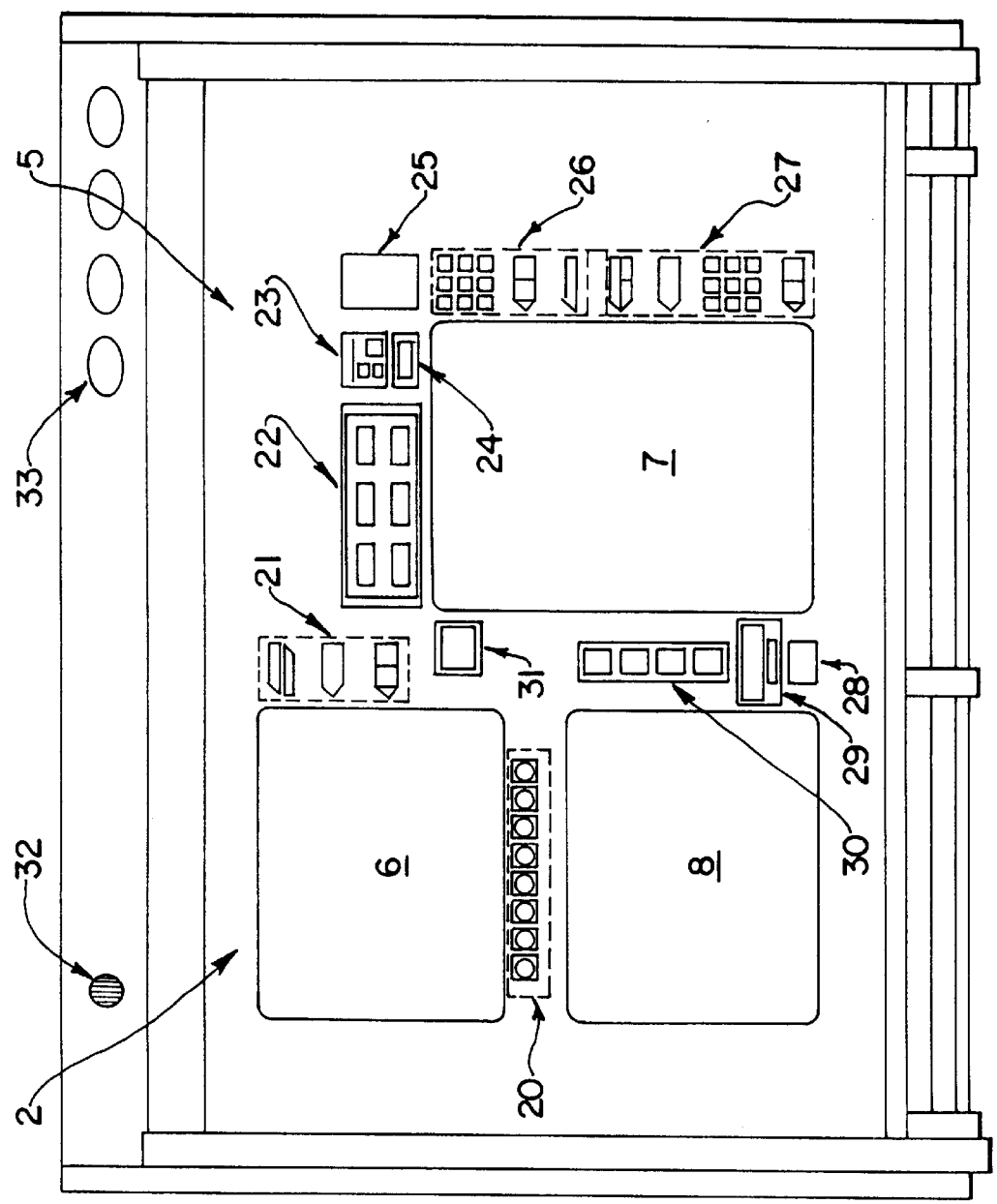
FIG. 3 is a diagram of the workstation worksurface showing the location of the displays and the permanent function symbols.

FIG. 3 is an illustration of workstation work surface 2 showing the location of the displays 6, 7, and 8,(also numbered 141, 133, and 125, respectively, in FIG. 2) as well as the locations and groupings of the permanent function symbols 20–31. While the preferred embodiment utilizes three displays and permanent function symbols illustrated in FIG. 3, other configurations and quantities of displays and permanent function symbols are possible and lie within the spirit of the present invention, and are utilized in alternative embodiments.

The present invention provides significant operational improvements over the prior art in its selection and integration of the subsystems of workstation 1. Specifically, in the integration of multiple displays on a single visual surface that the operator controls via a transparent conductive surface and stylus.

The present invention physically provides displays 125, 133 and 141 in a plane (work surface 2 of FIG. 3), thus establishing a desirable work and control surface. The work surface can be physically manipulated to accommodate the differing personal attributes of the user and differing task requirements of the specific activity. It combines a conductive surface interface that facilitates ease of user operation with the work surface. The conductive surface extends over all of the displays and beyond, thus creating surface area for permanent function symbols, further facilitating ease of use of the present invention. The present invention unifies and integrates the control of all system operations and controls onto and through this single conductive surface.

Visually, the displays are integrated by their position in a single plane, and the integrated conductive surface control system that operates them in a unified fashion. The images are integrated and coordinated through this same unified conductive surface control system.

For example, the permanent function symbols are used to select image editing modes. This causes a directory of image pages to appear on the menu display monitor. A pointer on that directory points to a specific directory entry, and the corresponding page is displayed on the document display or the still picture display, as may be appropriate according to whether the page is color (or continuous tone) or document (two-tone). The permanent function symbols are stylus selected to cause the directory pointer to advance (paging forward) and the pointer advances and simultaneously the next page is displayed on the appropriate display.

Images and displays are further integrated in that they may be transported in whole or in part between displays. Where the displays are of the same type, as in the case of menu and document displays, this can be a straightforward electronic transfer of the image data. Where the image type differs, as in the case of document and still picture displays, the transfer involves a manipulation between document and color/continuous tone formats. These transformations are performed in a conventional manner by special function unit 12 and main CPU unit 16, appropriately communicating through main system bus 20.

Images reside in either personal visual space or common visual space. This distinction can be either physical or virtual. The CPU and its software divide the memory into common visual space and personal visual space. Common visual space includes images that all of the linked workstations can view. Personal visual space includes images that can be viewed only by the workstation where they are stored. This division is accomplished through standard memory partitioning techniques.

Referring again to FIG. 3, conductive surface 5 of work surface 2 integrates the selection of the permanent function symbols 20–31 with selections made from the displays 6, 7 and 8. The versatile application of conductive surface 5 is accomplished by selectively allocating response capabilities to areas of conductive surface 5 occupied by either the permanent function symbols or the screen areas of displays 6, 7 and 8. Touching stylus 121a (of FIG. 2) to the response enabled area of a particular function results in the control of the corresponding screen area or function symbol. Stylus 121a is thus used for selecting from the permanent functions and controls offered by the system, including functions creating and controlling communication links with other systems, for selecting from menus appear on displays 6, 7 or 8 screens, and for annotating or editing images that appear on displays 6, 7 or 8. Thus, all work applications have been integrated through stylus 121a and conductive surface 5.

Permanent function symbols 20–27, 29–31 of FIG. 3 are grouped and positioned so as to positionally coordinate with the screen that they control. The permanent function symbols of the preferred embodiment will be further described. Color function symbols 20 permit the assignment of 1-of-8 different colors for annotations executed on the 640V×480H pels still picture display 6. Color function symbols 20 are much like a color palette, and the user can select the desired color by touching the stylus to the appropriate color function symbol. Page operation function symbols 21 control the still picture display 6 image page operations. Basic entry level functional area controls 22 control the image edit, conference, input/output, directory edit, end session, and utility functions. The following controls are provided: the print screen command 23, audio mute 24, and help menus 25, without requiring the user to descend into or disturb the various functional areas or menu levels. Screen controls 26 for the single screen mode (as opposed to the split screen mode) of high resolution display 7 include 8-way scroll functions, page forward/reverse, and page mark and retrieval. Split screen controls 27 provide an independent set of controls for the second image created when the split screen mode is activated. The abort control 28, teleconferencing files 29, and memoranda controls 30 are general functions that service displays 6, 7 and 8. These controls are primary menu levels and are located near the menu display to simplify the when controlling menu display 6. Overlay control symbol 31 allows the user to overlay other images on top of the image displayed on high resolution monitor 7.

Microphone 32 and speaker 33 (shown in FIG. 2) permit the operator of workstation 1 to utilize the hands-free audio communications. The audio operation of the present invention is acoustically activated, which gives the operator independence from manually controlling both a stylus and a telephone. Thus, the operator is able to communicate verbally and visually without complication or disruption of the workstation activity.

Referring now to FIG. 4(a) and FIG. 4(a) and FIG. 4(b) right side vies of workstation 1 are provided to illustrate the range of adjustments available with the present invention. The below described physical adjustments are accomplished with conventional motors and actuators, in a conventional manner. FIG. 4(a) illustrates workstation 1 with lower console 4 in the maximum vertical height adjustment 34 in combination with upper console 3 and work surface 2 maximum angular adjustment 35 relative to a horizontal reference line. FIG. 4(b) illustrates workstation 1 with lower console 4 in the minimum vertical height adjustment 36 in combination with upper console 3 and work surface 2 minimum angular adjustment 37 relative to a horizontal reference line. Any combination of adjustments, workstation height and work surface angle, are possible within the range of these minimum/maximum angle and height limits. Thus, the present invention can be adjusted in height and position to accommodate a range of user physical attributes and a range of applications.

In addition, the teachings and principles of U.S. Pat. No. 3,671,668 issued Jun. 20, 1972 to L. Reiffel, for "Teaching System Employing a Television Receiver"; U.S. Pat. No. 3,718,759, issued Feb. 27, 1973 to L. Reiffel, for "Audio-Visual Teaching System and Student Response Apparatus"; U.S. Pat. 3,617,630, issued Nov. 2, 1971 to L. Reiffel, for "Superimposed Dynamic Television Display System"; and U.S. Pat. No. 4,654,484 issued Mar. 31, 1987 to Reiffel et al. for "Video Compression/Expansion System" are applicable to the present invention, and the disclosures of each of these references is hereby incorporated by reference.

Figure 5:
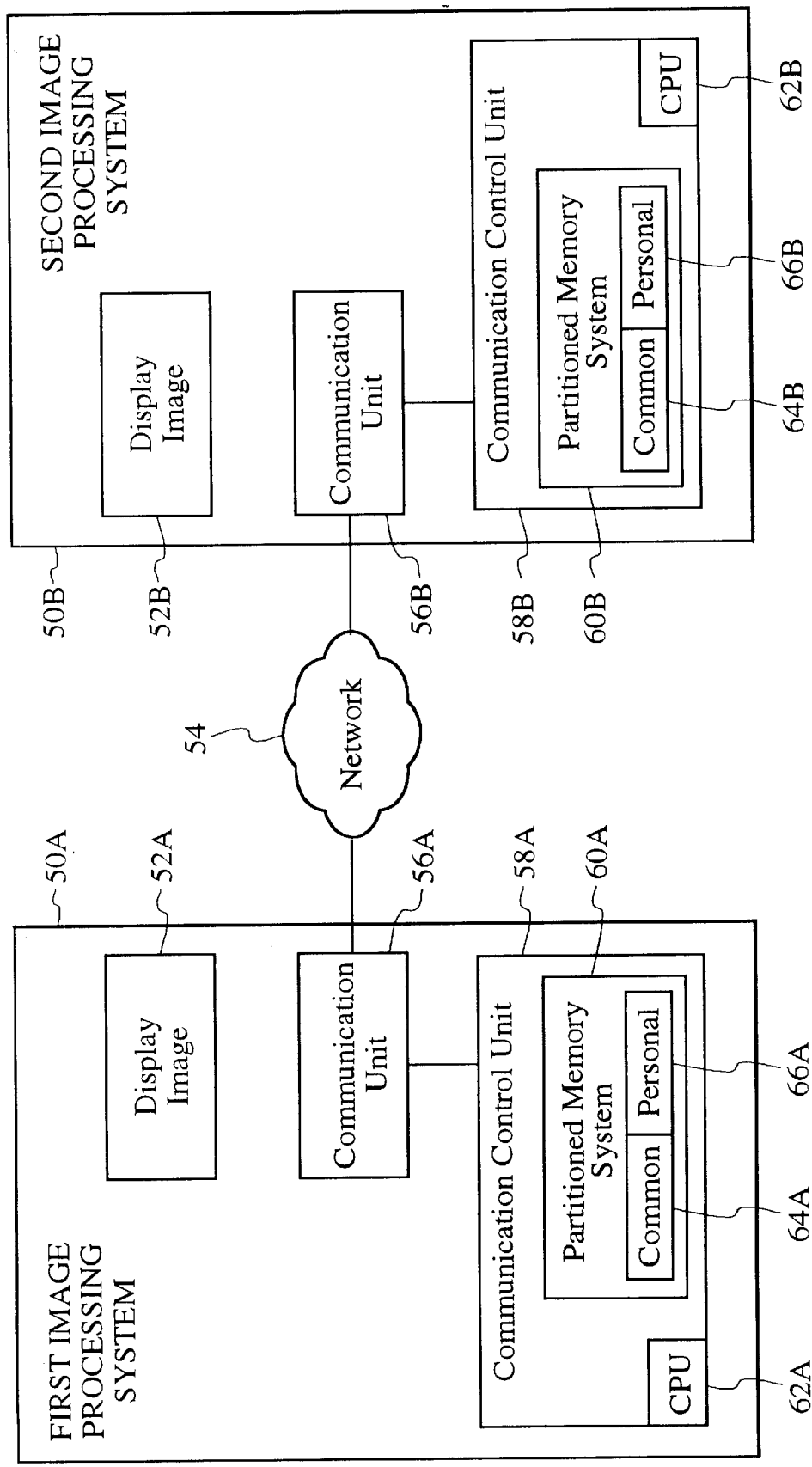
FIG. 5 is a block diagram illustrating a preferred embodiment of the present invention.

As will be appreciated from the foregoing, in accordance with the present invention an image processing apparatus may be provided in which one or more images may be stored in a personal memory/memory space, and one more images may be stored in a common memory/memory space, with the image(s) stored in the common memory/memory space capable of being commonly displayed on two or more image processing systems and edited as a group activity. As illustrated in FIG. 5, such an apparatus may consist of at least first and second image processing systems (50A and 50B; see also the block diagram of FIG. 2), with first and second image processing systems 50A and 50B including displays 52A and 52B for displaying at least one image. As illustrated and previously described, first and second image processing systems 50A and 50B are connected to network 54. Network 54 may serve to couple image information to first and second image processing systems 50A and 50B such as in a manner previously described. First and second image processing systems 50A and SOB preferably include a communication unit (56A and 56B) for coupling image information to and receiving information from network 54, and a control unit (58A and 58B) for controlling the communication unit (56A and 56B). The control unit (58A and 58B) preferably comprises a CPU (62A and 62B) and a partitioned memory system (60A and 60B). The memory systems (60A and 60B) include common memory (64A and 64B) and personal memory (66A and 66B) may storing a plurality of common and personal images, respectively. In accordance with the present invention, the image processing systems (50A and 50B) are controlled in a manner to be able to access (or control, alter the contents of, etc.) the common memory (64A and 64B) of both image processing systems and in a manner so as to able to access only its respective personal memory and not the personal memory of the other image processing systems. Preferably, the personal memory (66A and 66B) of each of the image processing systems contains one or more personal images that can be viewed only by the respective image processing system. In accordance with this invention, under the control of the CPUs (62A and 62B) in the respective image processing systems, a common image may be coupled to each of the image processing systems over network 54 and commonly displayed on each of the image processing systems, and the common image may be edited by image processing system 50A while being commonly displayed on image processing system 50B. Such image processing systems may be implemented as previously described herein (e.g., see FIG. 2 and related description, etc.).

While the preferred embodiment of the invention has been illustrated and described, it is to be understood that the invention is not limited to the precise construction herein disclosed, and the right is reserved to all changes and modifications coming within the scope of the invention as defined in the appended claims.

We claim:

1. An image processing apparatus, comprising:
   at least first and second image processing systems, wherein the first and second image processing systems each display at least one image, wherein the first and second information to each of the first and second image processing systems;
   wherein the first and second image processing systems each comprise:
      a communication unit coupling image information to and receiving information from the network,
      a control unit for controlling the communication unit, wherein the control unit comprises a CPU and a partitioned memory system, wherein the memory system comprises common memory and personal memory for storing a plurality of common and personal images, respectively, wherein each image processing system is controlled to access the common memory of all of the image processing systems, and wherein each of the image processing systems is controlled to access only its respective personal memory and not the personal memory of the other image processing system, wherein the personal memory of each of the image processing systems contains one or more personal images that can be viewed only by the respective image processing system;
   wherein, under control of the CPUs in the respective image processing systems, a common image is coupled to each of the image processing systems over the network and commonly displayed on each of the image processing systems, wherein the common image is edited by the first image processing system while being commonly displayed on each of the image processing systems.

2. The apparatus of claim 1, wherein each of the image processing systems further comprises an audio unit coupling audio information to the network, wherein the CPU controls the audio unit, wherein audio communications occur among one or more of the image processing systems while the common image being edited by the first image processing system is being commonly displayed on each of the image processing systems.

3. The apparatus of claim 1, further comprising an image pick-up device coupled to at least one of the image processing systems, wherein the common image is captured by the image pick-up device, stored in the common memory of each of the image processing systems and commonly displayed on each of the image processing systems.

4. The apparatus of claim 1, wherein each image processing system further comprises at least first and second displays coupled to the CPU of the image processing system, wherein the first display displays a graphic image, and wherein the second display displays textual information.

5. The apparatus of claim 4, wherein the common image comprises a graphic image, wherein the graphic image is edited by the first image processing system while being commonly displayed on each of the image processing systems.

6. The apparatus of claim 5, wherein each image processing system further comprises a third display coupled to the CPU of the image processing system and a pointing device, wherein the third display displays control information, wherein the CPU controls the first and second displays in response to pointing of the pointing device at the control information displayed on the third display.

7. The apparatus of claim 6, wherein each image processing system further comprises a coordinate sensing means having a transparent surface with a front surface and a back surface, wherein the pointing device comprises a stylus, wherein the coordinate sensing means further comprises a coordinate calculation means, wherein the stylus is connected to the calculation means and wherein the calculation means calculates the coordinate position of the stylus with respect to the transparent surface, and wherein the first, second and third displays are positioned in proximity to the back surface of the transparent surface wherein the transparent surface substantially overlays each of the displays.

8. The apparatus of claim 7, wherein each image processing system further comprises function symbols mechanically affixed to the transparent surface adjacent to one or more of the displays, wherein each of the function symbols is associated with a particular image processing function of the image processing system.

9. The apparatus of claim 8, wherein, for each image processing system, the CPU is responsive to the position of the stylus with respect to the transparent surface and wherein the CPU is further responsive to the coordinate calculation means of the coordinate sensing means when the stylus is positioned near any of the function symbols, wherein the, images displayed on the displays are controlled by the position of the stylus with respect to one or more of the displays and/or function symbols.

10. The apparatus of claim 4, wherein the common image comprises textual information, wherein the textual information image is edited by the first image processing system while being commonly displayed on each of the image processing systems.

11. The apparatus of claim 10, wherein each image processing system further comprises a third display coupled to the CPU of the image processing system and a pointing device, wherein the third display displays control information, wherein the CPU controls the first and second displays in response to pointing of the pointing device at the control information displayed on the third display.

12. The apparatus of claim 11, wherein each image processing system further comprises a coordinate sensing means having a transparent surface with a front surface and a back surface, wherein the pointing device comprises a stylus, wherein the coordinate sensing means further comprises calculation means, wherein the stylus is connected to the calculation means and wherein the calculation means calculates the coordinate position of the stylus with respect to the transparent surface, and wherein the first, second and third displays are positioned in proximity to the back surface of the transparent surface wherein the transparent surface substantially overlays each of the displays.

13. The apparatus of claim 12, wherein each image processing system further comprises function symbols mechanically affixed to the transparent surface adjacent to one or more of the displays, wherein each of the function symbols is associated with a particular image processing function of the image processing system.

14. The apparatus of claim 13, wherein, for each image processing system, the CPU is responsive to the position of the stylus with respect to the transparent surface and wherein the CPU is further responsive to the coordinate calculation means of the coordinate sensing means when the stylus is positioned near any of the function symbols, wherein the images displayed on the displays are controlled by the position of the stylus with respect to one or more of the displays and/or function symbols.

15. The apparatus of claim 1 further comprising a power supply coupled to at least one of the image processing systems, wherein the communication unit of the at least one image processing system monitors communications on the network, wherein the power supply coupled to the at least one image processing system has a low power mode, wherein the at least one image processing system monitors communications on the network while the power supply coupled to the at least one image processing system is in the low power mode.

16. The apparatus of claim 1, wherein the common memory and the personal memory of each of the image processing systems comprise physically partitioned memory.

17. The apparatus of claim 1, wherein the common memory and the personal memory of each of the image processing systems comprise virtually partitioned memory.

18. The apparatus of claim 1, wherein each of the image processing systems further comprises a display capable of displaying ligature images.

19. The apparatus of claim 1, wherein at least one of the image processing systems is controlled by a stylus, wherein the at least one image processing system is controlled by directing the stylus towards images displayed on the at least one image processing system.

20. The apparatus of claim 19, wherein the at least one image processing system is further controlled by directing the stylus towards an icon affixed to the at least one image processing system.

21. The apparatus of claim 1, wherein at least one of the image processing systems further comprises a facsimile unit coupled to the communication unit of the at least one image processing system, wherein the at least one image processing system transmits facsimile transmissions over the network.

22. In an image processing apparatus having at least first and second image processing systems coupled to a network, each of the first and second image processing systems having a partitioned memory system, a method comprising:

storing information in a personal memory space of the first image processing system, wherein information stored in the personal memory space of the first image processing system is accessible only by the first image processing system, wherein the information stored in the personal memory space of the first image processing system includes a plurality of personal images accessible only by the first image processing system, storing information in a personal memory space of the second image processing system, wherein information stored in the personal memory space of the second image processing system is accessible only by the second image processing system, wherein the information stored in the personal memory space of the second image processing system includes a plurality of personal images accessible only by the second image processing system;

storing information in a common memory space of each of the first and second image processing systems, wherein information stored in the common memory space of each of the first and second image processing systems includes a plurality of common images and is accessible by both of the first and second image processing systems;

displaying a common image on each of the first and second image processing systems;

editing the common image with the first image processing system, wherein the edited common image is displayed on each of the first and second image processing systems, wherein the common image is edited as a group activity on each of the first and second image processing systems.

23. The method of claim 22, wherein the common image is stored in the common memory space of each of the first and second image processing systems, and wherein the edited common image is stored in the common memory space of each of the first and second image processing systems.

24. The method of claim 22, further comprising the step of transmitting audio information between the first and second image processing systems over the network, wherein audio communications occur between the first and second image processing systems while the common image is being edited with the first image processing system.

25. The method of claim 24, wherein the audio information comprises the voice of an operator of the first image processing system, wherein the voice of the operator of the first image processing system is received at the second image processing system while the operator the first image processing system edits the common image.

26. The method of claim 25, wherein a visual representation of the operator of the first image processing system is displayed on the second image processing system while the voice of the operator is being received at the second image processing system.

27. The method of claim 24, wherein each of the first and second image processing systems comprise a plurality of displays and a coordinate sensing device having a transparent surface with a front surface and a back surface, a stylus, and a coordinate calculator, wherein the stylus is connected to the coordinate calculator and wherein the coordinate calculator calculates the coordinate position of the stylus with respect to the transparent surface, and wherein the plurality displays are positioned in proximity to the back surface, and wherein the transparent surface wherein the transparent surface substantially overlays each of the displays, wherein each image processing system further comprises function symbols mechanically affixed to the transparent surface adjacent to one or more of the displays, wherein each of the function symbols is associated with a particular image processing function of the image processing system, the method further comprising:

positioning the stylus near one of the displays and/or function symbols of the first image processing system, wherein the common image displayed on the first and second image processing system is controlled by the position of the stylus with respect to the one display and/or function symbols of the first image processing system.

28. The method of claim 22 further comprising the steps of placing at least one of the image processing systems in a low power mode, wherein the at least one image processing system monitors communications on the network while the at least one image processing system is in the low power mode.

29. The method of claim 22, wherein the common memory space and the personal memory space of each of the image processing systems comprise physically partitioned memory.

30. The method of claim 22, wherein the common memory space and the personal memory space of each of the image processing systems comprise virtually partitioned memory.

31. The method of claim 22, wherein each of the image processing systems includes a display capable of displaying ligature images.

32. The method of claim 22, wherein at least one to the image processing systems is controlled by a stylus, wherein the at least one image processing system is controlled by directing the stylus towards images displayed on the at least one image processing system.

33. The method of claim 32, wherein the at least one image processing system is further controlled by directing the stylus towards an icon affixed to the at least one image processing system.

34. The method of claim 22, wherein at least one of the image processing systems includes a facsimile unit, wherein the at least one image processing system transmits facsimile transmissions over the network.

35. An image processing system, comprising:

a communication unit coupling image information to and receiving information from a network, wherein the communication unit is capable of receiving image information from a second image processing system coupled to the network;

a display for displaying at least one image, wherein the display is capable of displaying image information received from the network;

a control unit for controlling the communication unit, wherein the control unit comprises a CPU and a partitioned memory system, wherein the memory system comprises common memory and personal memory for storing a plurality of common and personal images, respectively, wherein the image processing system is controlled so that the second image processing system coupled to the network may access the common memory of the image processing system, and wherein the image processing system is controlled so that the second image processing system is not capable of accessing the personal memory of the image processing system, wherein the personal memory of the image processing system contains one or more personal images that cannot be viewed by the second image processing system but can be viewed by the image processing system;

wherein, under control of the CPU in the image processing system, the image processing system is controlled to display a common image that is coupled to the network for common display on the image processing system and the second image processing system, wherein the common image is edited by the image processing system, wherein the edited common image is coupled to the network for common display on the image processing system and the second image processing system.

36. The apparatus of claim 35, wherein the image processing system further comprises an audio unit coupling audio information to the network, wherein the CPU controls the audio unit, wherein audio communications occur among the image processing systems while the common image being edited by the first image processing system is being commonly displayed on each of the image processing systems.

37. The apparatus of claim 35, further comprising an image pick-up device coupled to the image processing system, wherein the common image is captured by the image pick-up device for being stored in the common memory of each of the image processing systems and commonly displayed on each of the image processing systems.

38. The apparatus of claim 35, wherein the image processing system further comprises at least first and second displays coupled to the CPU of the image processing system, wherein the first display displays a graphic image, and wherein the second display displays textual information.

39. The apparatus of claim 38, wherein the common image comprises a graphic image, wherein the graphic image is edited by the image processing system while being commonly displayed on each of the image processing systems.

40. The apparatus of claim 38, wherein the common image comprises textual information, wherein the textual information image is edited by the image processing system while being commonly displayed on each of the image processing systems.

41. The apparatus of claim 35, wherein the image processing system further comprises a pointing device, wherein the CPU controls the display of the image processing system in response to pointing of the pointing device at information displayed on the display.

42. The apparatus of claim 41, wherein the image processing system further comprises a coordinate sensing system having a transparent surface with a front surface and a back surface, wherein the pointing device comprises a stylus, wherein the coordinate sensing system further comprises a coordinate calculation circuit, wherein the stylus is connected to the calculation circuit and wherein the calculation circuit calculates the coordinate position of the stylus with respect to the transparent surface, and wherein the display is positioned in proximity to the back surface of the transparent surface wherein the transparent surface substantially overlays the display.

43. The apparatus of claim 42, wherein the image processing system further comprises one or more function symbols mechanically affixed to the transparent surface adjacent to the display, wherein each of the function symbols is associated with a particular image processing function of the image processing system.

44. The apparatus of claim 43, wherein the CPU is responsive to the position of the stylus with respect to the transparent surface and wherein the CPU is further responsive to the coordinate calculation circuit of the coordinate sensing system when the stylus is positioned near any of the function symbols, wherein the image displayed on the display is controlled by the position of the stylus with respect to one or more of the display and/or function symbols.

45. The apparatus of claim 35 further comprising a power supply coupled to the image processing system, wherein the communication unit of the image processing system monitors communications on the network, wherein the power supply coupled to the image processing system has a low power mode, wherein the image processing system monitors communications on the network while the power supply coupled to the image processing system is in the low power mode.

46. The apparatus of claim 35, wherein the common memory and the personal memory of the image processing system comprises physically partitioned memory.

47. The apparatus of claim 35, wherein the common memory and the personal memory of the image processing system comprises virtually partitioned memory.

48. The apparatus of claim 35, wherein the image processing system includes a display capable of displaying ligature images.

49. The apparatus of claim 35, wherein the image processing system is controlled by a stylus, wherein the image processing system is controlled by directing the stylus towards images displayed on the image processing system.

50. The apparatus of claim 49, wherein the image processing system is further controlled by directing the stylus towards an icon affixed to the image processing system.

51. The apparatus of claim 35, wherein the image processing system further comprises a facsimile unit coupled to the communication unit of the image processing system, wherein the image processing system transmits facsimile transmissions over the network.

52. The apparatus of claim 35, wherein the image processing system couples a color image to the network for transmission from the image processing system to the second image processing system, wherein the image processing system transmits the color image to the second image processing system in low and high resolution phases, wherein the second image processing system displays the color image first in low resolution and later in high resolution.

53. The apparatus of claim 52, wherein the color image is transmitted by the image processing system in a low resolution phase in the form of reference cell values, wherein the second image processing system receives and expands the reference cell values to display the color image in low resolution.

54. The apparatus of claim 53, wherein the color image is displayed in low resolution a plurality of times.

55. The apparatus of claim 53, wherein the reference cell values comprise pixel data of the color image.

56. The apparatus of claim 35, wherein the image processing system receives a color image from the network, wherein the image processing system receives the color image in low and high resolution phases, wherein the image processing system displays the color image first in low resolution and later in high resolution,.

57. The apparatus of claim 56, wherein the color image is received by the image processing system in a low resolution phase in the form of reference cell values, wherein the image processing system receives and expands the reference cell values to display the color image in low resolution.

58. The apparatus of claim 57, wherein the color image is displayed in low resolution a plurality of times.

59. The apparatus of claim 57, wherein the reference cell values comprise pixel data of the color image.

60. In an image processing system for coupling to a second image processing system coupled to a network, the image processing system having a partitioned memory system, a method comprising:

storing information in a personal memory space of the image processing system, wherein information stored in the personal memory space of the image processing system is accessible only by the image processing system, wherein the information stored in the personal memory space of the image processing system includes one or more personal images accessible only by the image processing system;

storing information in a common memory space of each of the image processing systems, wherein information stored in the common memory space of each of the image processing systems includes one or more common images and is accessible by both of the image processing systems;

displaying a common image on each of the image processing systems;

editing the common image with tie image processing system, wherein the edited common image is coupled to the network for common display on each of the image processing systems, wherein the common image is edited as a group activity on each of the image processing systems.

61. The method of claim 60, wherein the common image is stored in the common memory space of each of the image processing systems, and wherein the edited common image is stored in the common memory space of each of the image processing systems.

62. The method of claim 60, further comprising the step of transmitting audio information between the image processing systems over the network, wherein audio communications occur between the image processing systems while the common image is being edited with the image processing system.

63. The method of claim 62, wherein the audio information comprises the voice of an operator of the image processing system, wherein the voice of the operator of the image processing system is coupled to the network for receiving at the second image processing system while the operator of the image processing system edits the common image.

64. The method of claim 63, wherein a visual representation of the operator of the image processing system is displayed on the second image processing system while the voice of the operator is being received at the second image processing system.

65. The method of claim 60, further comprising the steps of placing the image processing system in a low power mode, wherein the image processing system monitors communications on the network while the image processing system is in the low power mode.

66. The method of claim 60, wherein the common memory space and the personal memory space of the image processing system comprises physically partitioned memory.

67. The method of claim 60, wherein the common memory space and the personal memory space of the image processing system comprises virtually partitioned memory.

68. The method of claim 60, wherein the image processing system includes a display capable of displaying ligature images.

69. The method of claim 60, wherein the image processing system is controlled by a stylus, wherein: the image processing system is controlled by directing the stylus towards images displayed on the image processing system.

70. The method of claim 69, wherein the image processing system is further controlled by directing the stylus towards an icon affixed to the image processing system.

71. The method of claim 60, wherein the image processing systems includes a facsimile it, wherein the image processing system transmits facsimile transmissions over the network.

72. The method of claim 60, wherein the image processing system couples a color image to the network for transmission from the image processing system to the second image processing system, wherein the image processing system transmits the color image to the second image processing system in low and high resolution phases, wherein the second image processing system displays the color image first in low resolution and later in high resolution.

73. The method of claim 72, wherein the color image is transmitted by the image processing system in a low resolution phase in the form of reference cell values, wherein the second image processing system receives and expands the reference cell values to display the color image in low resolution.

74. The method of claim 73, wherein the color image is displayed in low resolution a plurality of times.

75. The method of claim 73, wherein the reference cell values comprise pixel data of the color image.

76. The method of claim 60, wherein the image processing system receives a color image from the network, wherein the image processing system receives the color image in low and high resolution phases, wherein the image processing system displays the color image first in low resolution and later in high resolution.

77. The method of claim 76, wherein the color image is received by the image processing system in a low resolution phase in the form of reference cell values, wherein the image processing system receives and expands the reference cell values to display the color image in low resolution.

78. The method of claim 77, wherein the color image is displayed in low resolution a plurality of times.

79. The method of claim 77, wherein the reference cell values comprise pixel data of the color image.

* * * * *

UNITED STATES PATENT AND TRADEMARK OFFICE
CERTIFICATE OF CORRECTION

PATENT NO. : 5,892,509
DATED : April 6, 1999
INVENTOR(S) : Jacobs, et al.

It is certified that error appears in the above-identified patent and that said Letters Patent is hereby corrected as shown below:

Column 13, line 42, after "Video Compression/Expansion System", insert --(which discloses, for example, transmitting a color image from a first system to a second system, wherein the first system transmits the color image to the second system in low and high resolution phases, with the second system displaying the color image first in low resolution and later in high resolution, and that the color image may be transmitted by the first system in a low resolution phase in the form of reference cell values to wherein the second system receives and expands the reference cell values to display the color image in low resolution, and that the color image may be displayed in low resolution a plurality of times, and that the reference cell values may consist of pixel data of the color image),--;

Column 14, line 36, before "information", insert --image processing systems are connected to a network wherein the network couples image--;

Column 17, line 62, after "plurality", insert --of--;

Column 17, line 63, after "surface", insert --of--;

Column 17, line 63, delete "and wherein";

Column 20, line 54, delete ",";

Column 22, line 8, delete ":".

Signed and Sealed this

Fifteenth Day of February, 2000

*Attest:*

Q. TODD DICKINSON

*Attesting Officer*     *Commissioner of Patents and Trademarks*